(12) United States Patent
Gravina (10) Patent No.: US 9,702,451 B2
(45) Date of Patent: Jul. 11, 2017

(54) PLANET-CARRIER FOR AN EPICYCLIC GEARING AND EPICYCLIC GEARING PROVIDED WITH SUCH A PLANET-CARRIER

(71) Applicant: GE AVIO S.r.l., Rivalta di Torino (IT)

(72) Inventor: Michele Gravina, Minervino Murge (IT)

(73) Assignee: GE AVIO S.R.L., Rivalta Di Torino (IT)

(*) Notice: Subject to any disclaimer, the term of this patent is extended or adjusted under 35 U.S.C. 154(b) by 43 days.

(21) Appl. No.: 14/857,294

(22) Filed: Sep. 17, 2015

(65) Prior Publication Data

US 2016/0201794 A1    Jul. 14, 2016

(30) Foreign Application Priority Data

Sep. 17, 2014   (IT) ............................... TO2014A0736

(51) Int. Cl.
| | |
|---|---|
| *F16H 57/08* | (2006.01) |
| *F16H 3/46* | (2006.01) |

(Continued)

(52) U.S. Cl.
CPC ........... *F16H 57/082* (2013.01); *F03D 15/10* (2016.05); *F16H 3/46* (2013.01); *F16H 57/08* (2013.01);

(Continued)

(58) Field of Classification Search
None
See application file for complete search history.

(56) References Cited

U.S. PATENT DOCUMENTS

| | | | | |
|---|---|---|---|---|
| 5,470,286 A | * | 11/1995 | Fan ........................ | F16H 57/082 475/331 |
| 7,806,799 B2 | | 10/2010 | Smook | |

(Continued)

FOREIGN PATENT DOCUMENTS

| | | |
|---|---|---|
| EP | 2072858 | 6/2009 |
| EP | 2072863 | 6/2009 |

(Continued)

OTHER PUBLICATIONS

Italian Search Report dated May 7, 2015 corresponding to Italian Application No. ITT020140736; 9 pages.

*Primary Examiner* — Justin Holmes
(74) *Attorney, Agent, or Firm* — Ohlandt, Greeley, Ruggiero & Perle, LLP (57) ABSTRACT

A planet-carrier for an epicyclic gearing having an annular structure, provided with a coupling portion for being connected to a rotating member or to a static structure in an angularly fixed manner, and a ring that is coaxial to the annular structure along a transmission axis and consists of a plurality of plate-shaped sectors and of a plurality of attachment sectors, alternating with one another about the transmission axis; the plate-shaped sectors lie on a plane orthogonal to the transmission axis and are fixed with respect to pairs of pins, which protrude in opposite directions from the plate-shaped sectors and are adapted to carry respective planet gears; each of the attachment sectors is fastened to the structure by a corresponding pair of arms, which converge with each other towards the ring and are elastically deformable so as to allow a relative movement between the ring and the structure under load.

13 Claims, 5 Drawing Sheets

(51) Int. Cl.
    *F03D 15/10*    (2016.01)
    *F16H 48/40*    (2012.01)
(52) U.S. Cl.
    CPC ..... *F05B 2260/40311* (2013.01); *F16H 48/40* (2013.01); *Y02E 10/722* (2013.01)

(56) References Cited

U.S. PATENT DOCUMENTS

| | | | |
|---|---|---|---|
| 8,747,278 B2 | 6/2014 | Smook | |
| 2005/0026744 A1* | 2/2005 | Illerhaus | F16H 57/082 475/331 |
| 2011/0092333 A1* | 4/2011 | Murata | B60K 6/365 475/331 |
| 2012/0129641 A1* | 5/2012 | Palfai | H02K 7/116 475/149 |

FOREIGN PATENT DOCUMENTS

| | | |
|---|---|---|
| EP | 2256343 | 12/2010 |
| EP | 2339208 | 6/2011 |
| WO | 2013065024 | 5/2013 |

* cited by examiner

PLANET-CARRIER FOR AN EPICYCLIC GEARING AND EPICYCLIC GEARING PROVIDED WITH SUCH A PLANET-CARRIER

The present invention relates to a planet-carrier for an epicyclic gearing, in particular for aeronautic applications, to which the following description will refer, but without any loss of generality.

BACKGROUND OF THE INVENTION

As is known, epicyclic gearings are widely used in the field of aeronautic engines for transmitting drive and converting power between a turbine engine (having high speed and low torque) and at least one propulsive element (having high torque and low speed), as they are very efficient for implementing this function whilst keeping weight and bulk down.

Similar design solutions exist outside of the aeronautics industry, especially in the aerogenerator construction field, where the gearing instead performs the function of a speed multiplier and not a reducer.

In addition to the natural saving in weight, the need to reduce the bulk of the gearing as much as possible is particularly felt in the new aeronautic engine architectures being studied for reducing consumption and pollution (architectures such as non-direct-driven types of turbo fan and open rotor). In these architectures, epicyclic gearing is actually integrated with the turbine engine, where the diametral envelope of the gearing tends to condition the geometries of the passageways for the flow of air or combustion gases, and therefore decisively affects the efficiency of the turbine engine.

One advantageous solution for implementing these gearings contemplates using a planet-carrier having an annular plate that supports two arrays of planet gears, arranged on opposite sides of the plate. In particular, the planet gears are mounted with bearings on respective pins, which protrude from the plate in opposite directions parallel to the axis of the gearing. Solutions of this type are known, for example, from EP2339208 and WO2013065024, in the name of the applicant.

Within the field of this type of solution, a strong need is felt to seek a perfectly equal distribution of the loads along the various torque transfer paths in the gearing. This equal distribution is a necessary condition for achieving maximum lightness and minimum overall bulk for the gearing. In fact, potential load maldistribution and the uncertainty in estimating this maldistribution imposes using overload factors in the design and sizing of the components of the gearing (cogwheels, bearings, etc.), independently of what their effective stress state is, with consequent oversizing of all the parts, even those that are less stressed in practice.

Load maldistribution is essentially due to the following factors:
 an epicyclic gearing, also depending on the particular solution adopted, may become hyperstatic, and therefore the torque transfer paths are inevitably subjected to greater stress where greater rigidity is provided;
 with respect to the nominal assembly and geometric conditions, the gearing inevitably has constructional and assembly errors and tolerances that cause relative displacements between the various components with respect to that planned by design and therefore generate overloads;
 asymmetries in the loads/displacements can possibly be imposed from the outside, at the connection interfaces of the gearing.

In general, the main solutions capable of minimizing the first two of the above-indicated factors can be classified as follows:
 solutions that aim at minimizing the geometrical differences (asymmetries) along the various torque transfer paths and at introducing orientable elements or flexible elements to support the planet gears, for example of the so-called flexpin type (where the pins that support the planet gears have the ability to bend in a localized manner); and
 solutions that aim at compensating the asymmetries by an opportune balancing of the rigidity on the various torque transfer paths.

The solution described in WO2013065024 effectively reduces load maldistribution by introducing radial joints to support the plate. However, this solution needs a relatively large number of components and the joints are subject to wear on the friction-coupled parts, and therefore have low reliability.

It is therefore preferable to direct design towards solutions where the planet-carrier has no joints.

In this regard, in the solutions described in patents EP2072863 and EP2072858, the planet-carrier is advantageously made in a single piece.

However, these last two solutions have a considerable asymmetry of the planet-carrier with respect to the plane of symmetry of two arrays of planet gears and do not contemplate the introduction of flexible elements of the flexpin type to support these planet gears.

In particular, the single-piece planet-carrier is constituted by a plate that supports the two arrays of planet gears, via an attachment portion connected to a rotating shaft or to a static structure, and by arms or beams that connect the plate to the attachment portion. These arms are substantially parallel to the axis of the gearing and are positioned in the spaces between the planet gears, in a circumferential direction. Torque is thus transferred, from the plate to the above-mentioned arms and from the latter to the attachment portion.

This architecture is unsatisfactory, as the arms, as well as deforming under load, tend to transfer the deformations that are naturally present in the attachment portion during use to the plate. As a result, the plate is subjected to a bending moment imparted by the arms at the respective connection points. The bending of the plate, resulting from these localized bending moments, causes the axes of the pins supporting the planet gears to tilt, thus generating an undesired unbalancing, i.e. maldistribution, of the loads on the planet gears between one and the other of the two arrays and undesired reaction stress arises in the connection zone between the pins and the plate.

To limit this unbalancing, caused by the deformation of the attachment portion, and hence contain the stress generated by the bending moments in the plate, the latter must be made with a substantial axial width. However, this sizing makes the planet-carrier particularly sensitive to gearing construction and assembly errors and tolerances (for example, displacements of the position of the planet gears with respect to that planned by design). This sensitivity to errors and tolerances results in further load maldistribution and significant overloads on the planet gears.

Therefore, the solutions described in EP2072863 and EP2072858 are not able to effectively compensate for the asymmetry of the planet-carrier in order to limit load maldistribution.

Moreover, the particular solutions proposed in EP2072863 and EP2072858 do not allow making the support pins of the planet gears in one piece with the plate, as, by doing so, it would not be possible to mount the planet gears and associated bearings. Therefore, these solutions require couplings with high interference between the carried pins and the plate in order to prevent the significant risk of wear on the parts in contact.

SUMMARY OF THE INVENTION

The object of the present invention is to provide a planet-carrier for an epicyclic gearing that enables the above-described problems to be solved in a simple and inexpensive manner.

According to the present invention, a planet-carrier for an epicyclic gearing is provided as defined claim 1.

BRIEF DESCRIPTION OF THE DRAWINGS

The invention shall now be described with reference to the accompanying drawings, which illustrate a non-limitative embodiment, in which.

DETAILED DESCRIPTION OF THE INVENTION

Figure 1:
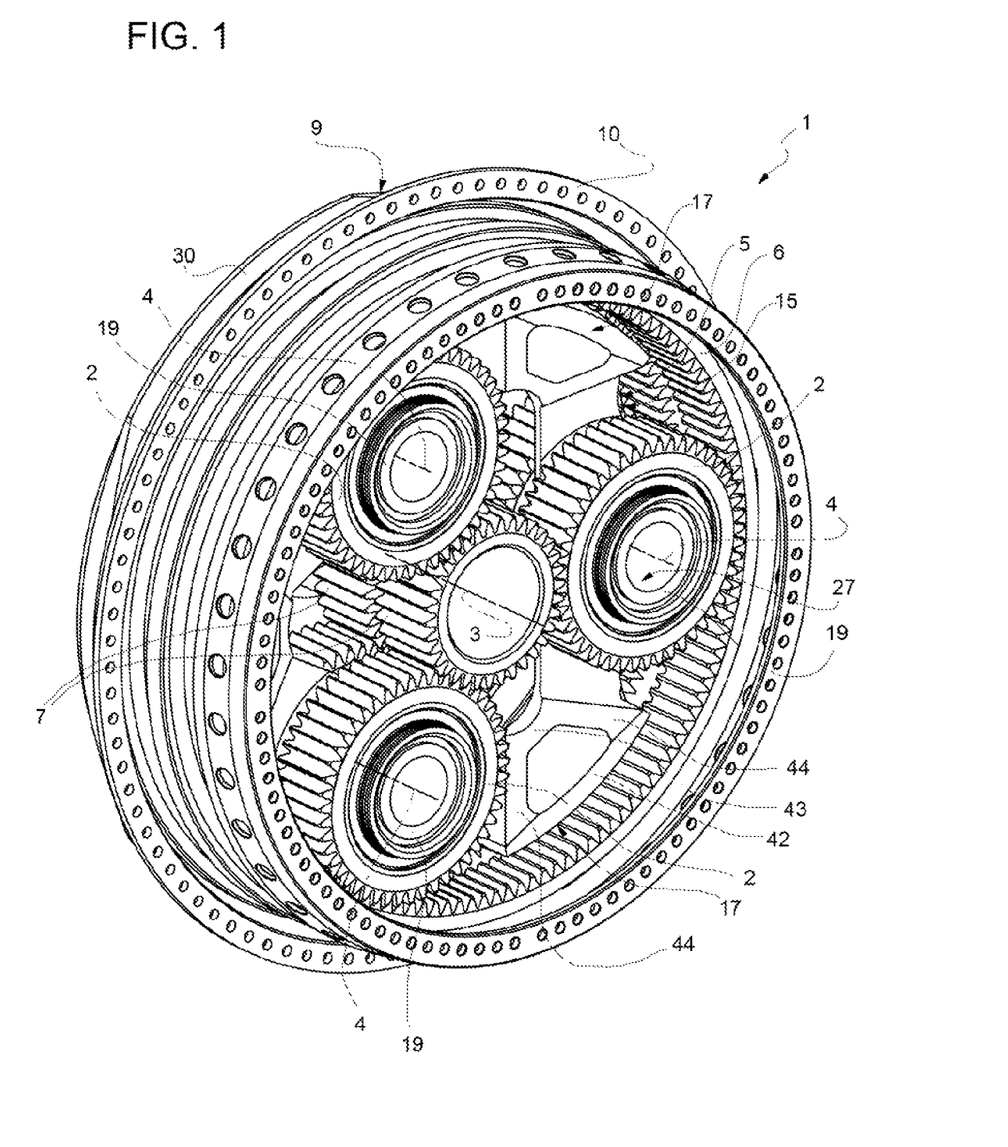
FIG. 1 is a perspective of an epicyclic gearing that is equipped with a preferred embodiment of the planet-carrier according to the present invention.

With reference to FIG. 1, reference numeral 1 indicates an epicyclic gearing comprising a plurality of planet gears 2, which are arranged about an axis 3, rotate about respective axes 4, parallel and eccentric with respect to axis 3, and are supported by a planet-carrier 5.

The planet gears 2 are arranged so as to form two arrays 2a and 2b symmetrical with respect to a plane P orthogonal to axis 3 and mesh, outwardly, with two inner toothings of a ring gear 6 and, inwardly, with two sun gears 7, coaxial and fixed with respect to a shaft 8. Advantageously, the sun gears 7 are made in one piece with the shaft 8. According to variants that are not shown, the toothings of the ring gear 6 and/or the two sun gears 7 are replaced by a single toothing of sufficient axial length to mesh with the planet gears 2 of both arrays 2a and 2b.

Preferably, but not exclusively, there are three planet gears 2 for each array 2a and 2b, such that the axes 4 are angularly equidistant from each other about axis 3 by 120°.

Advantageously, the planet-carrier 5 is defined by a monolithic body, i.e. a body made in a single piece, and comprises an annular structure 9, which defines an extraction/insertion member for the pair and has an coupling portion 10 defining a coupling for connecting the planet-carrier 5 in an angularly fixed manner to a member that is not shown, for example to an output drive shaft, or to a static structure. In the particular example shown, the coupling portion 10 is defined by a flange designed to be fastened by screws or bolts to the rotating member or to the static structure. Alternatively, the coupling portion 10 is defined by a hole spline or a shaft spline.

In the particular example shown, the coupling portion 10 is positioned at a larger radius with respect to the ring gear 6 and to the annular structure 9 and is displaced towards plane P starting from structure 9. According to a variant that is not shown, the coupling portion 10 is positioned at the side of the gearing 1 along axis 3, at a greater or smaller radius with respect to the ring gear 6 and to the annular structure 9.

Figure 3:
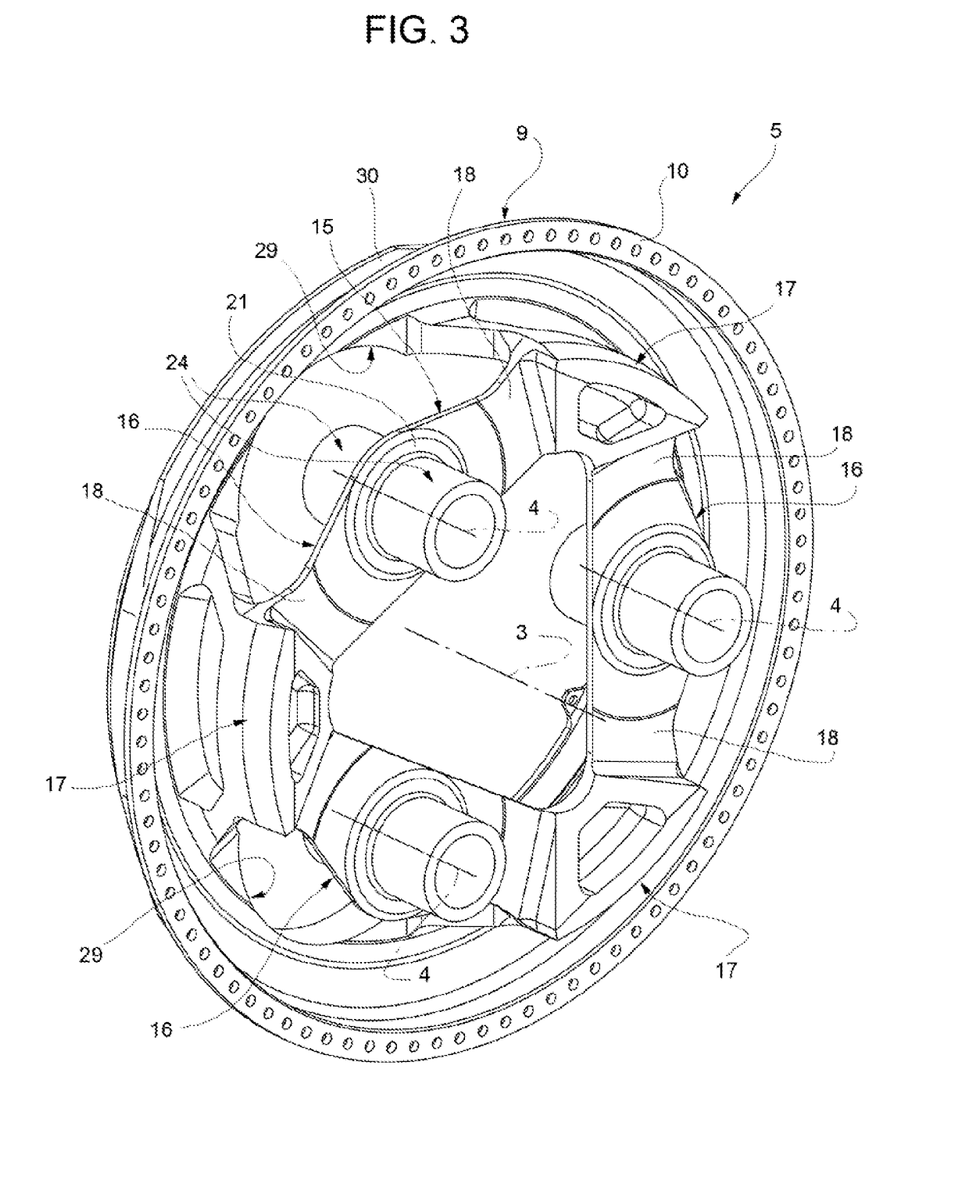
FIG. 3 is a perspective of the planet-carrier in FIGS. 1 and 2.

With reference to FIG. 3, the planet-carrier 5 further comprises a ring 15, which is coaxial to the structure 9 along axis 3 and is constituted by a plurality of sectors 16 and by a plurality of sectors 17, alternating with one another in a circumferential direction. Sectors 16 are defined by plate-shaped sectors that lie on plane P and terminate in the circumferential direction in flexible thin-wall portions 18, joined to sectors 17. Sectors 16 have, for example, a thickness of less than 10 mm (typically a thickness of 5-7 mm): these thickness values are typical for 15 MW gearings with two arrays of three planet gears each. At the same time, sectors 17 are stiffer to flexure than sectors 16.

Figure 2:
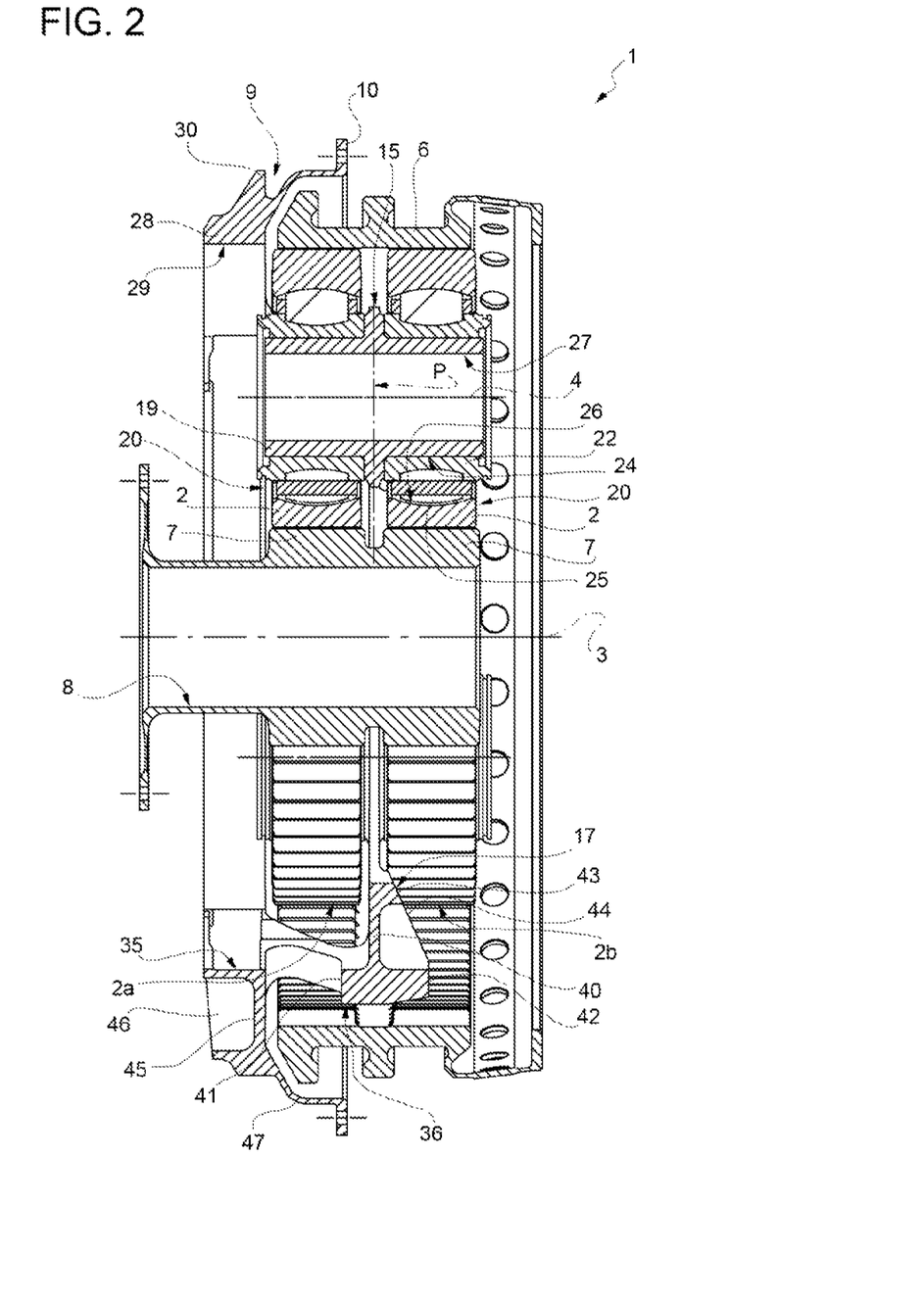
FIG. 2 is a cross-section of the gearing in FIG. 1 along a meridian section plane.

As shown in FIGS. 1 and 2, the planet gears 2 are supported by pins or shafts 19 via respective bearings 20, preferably defined by rolling bearings. Each of the pins 13 is preferably made in one piece with a corresponding sector 16, such that the pins 19 form part of the planet-carrier 5.

The solution with the pins 19 in a single piece with sectors 16 is better because: it reduces the number of components; it reduces the risk of wear on interference-fitted joints and the potential development of fatigue cracks on the worn surfaces; it facilitates mounting the planet gears due to the particular shape of the annular structure 9, as will be better described hereinafter. Nevertheless, according to a variant that is not shown, the pins 19 could be separate parts that are fastened to the respective sectors 16, for example by interference fitting.

As can be seen in FIG. 3, sectors 16 preferably comprise respective ridges 21, which protrude axially and in opposite directions with respect to portions 18 and define an axial shoulder against which the inner races 22 of the bearings 20 rest (FIG. 2). Each race 22 is fitted on the outer cylindrical surface 24 of the corresponding pin 19, while the bearings 20 preferably have no outer race: in other words, as can be seen in FIG. 2, the outer raceway of the rolling bodies 25 of the bearings 20 is defined by an inner surface 26 of the planet gear 2. Preferably, the rolling bodies 25 are spherical roller bearings, so that the raceways are concave and therefore capable of decoupling the toothing of the planet gears 2 from the deformations of the pins 19 under load.

As mentioned above, the pins 19 protrude axially from both faces of sectors 16 and are opposite each other along the axes 4. Preferably, the pins 19 define respective axial passages 27 engaged by connection devices (not shown), which lock the inner races 22 axially against the ridges 21.

Preferably, the toothings of the planet gears 2 are cylindrical with straight teeth.

The planet gears of array 2a are arranged, with respect to plane P, on the same side where the structure 9 is provided. The shape and dimensions of the structure 9 are determined on a project basis and also based on the diameter of the planet gears 2 and on the position of the axes 4 so as leave sufficient radial play for fitting and removing the planet gears of array 2a, along the respective axes 4, on the pins 19.

Figure 5:
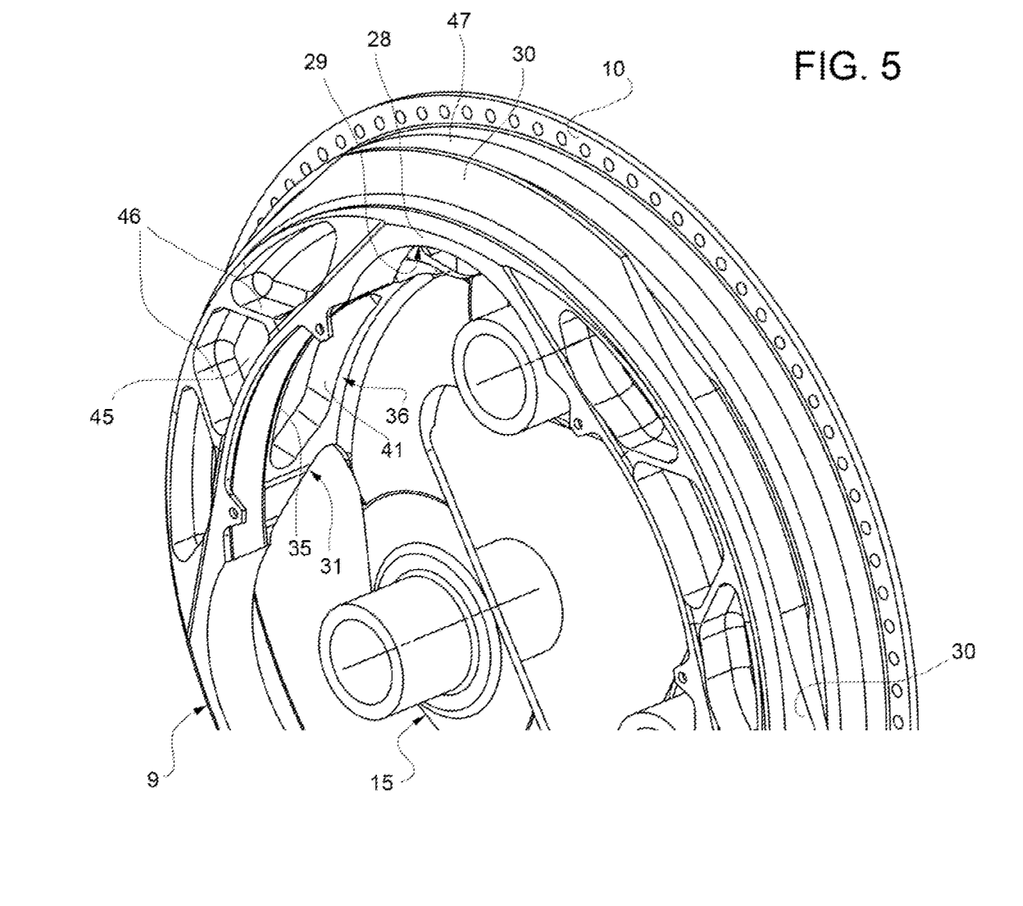
FIG. 5 is a different perspective of the planet-carrier in FIG. 3.

To this end, and with reference to FIGS. 2 and 5, for each pin 19, the structure 9 comprises a corresponding sector 28, radially hollowed-out so as to form a recess 29, which is aligned with the pin 19 along axis 4 and has a size and shape such as to allow the axial passage of the planet gear 2 through the structure 9. Furthermore, the structure 9 comprises, for each sector 28, a respective stiffening rib 30 which protrudes radially outwards from said sector 28 to limit-radial deformations.

According to variants that are not shown, the structure 9 is a separate piece from the ring 15 and is fastened to the latter during assembly of the gearing 1. In this case, and/or in the case where the pins 19 are separate parts mounted on sectors 16, in general, no interference problems exist for mounting the planet gears of array 2a, and therefore the structure 9 can possibly have a shape that shrinks towards axis 3 (for example, a bell-like shape) for being directly connected to a rotating shaft.

Figure 4:
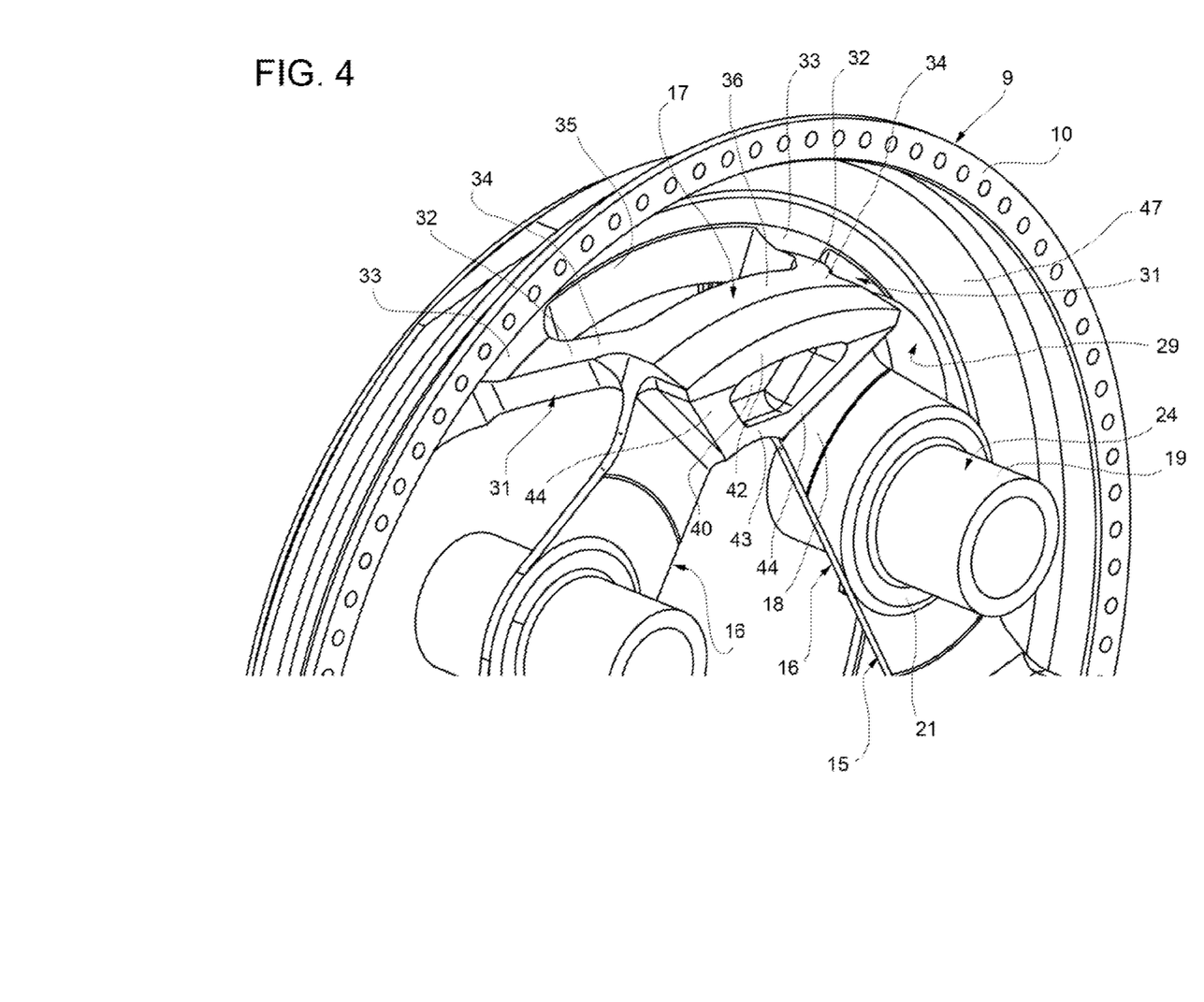
FIG. 4 is an enlargement of a detail of the planet-carrier in FIG. 3.

As can be seen in FIG. 4, for each sector 17, the planet-carrier 5 comprises a respective pair of connecting arms or beams 31, which are arranged in the spaces between two adjacent planet gears of the array 2a and connect the sector 17 to the structure 9, so as to transfer shearing forces (tangential forces) and therefore torque between the ring 15 and the structure 9.

The arms or beams 31 comprise respective intermediate portions 32, which converge towards each other and are preferably straight, and respective ends 33 and 34 defining a connection of portions 32 to the structure 9 and to sectors 17, respectively.

The arms 31 form a trapezoidal-shaped quadrilateral together with two portions 35 and 36, which are substantially tangential or circumferential and define the longer base and the shorter base of the trapezium. In the preferred embodiment described and illustrate herein, the planet-carrier 5 is made in a single piece, where portions 35 form part of structure 9 and alternate with sectors 28 around axis 3, and portions 36 respectively constitute part of sectors 17.

According to variants that are not shown, the above-indicated quadrilaterals are separate from the structure 9 and/or from the ring 15: in these cases, portions 35 are fastened by screws or bolts to the structure 9 and/or portions 35 are fastened by screws or bolts to sectors 17.

The two arms 31 of each quadrilateral are provided with greater elastic flexural deformation with respect to portions 35 and 36, and therefore the quadrilateral deforms under load. In particular, the elastic deformation of the arms 31 enables a relative movement under load between the ring 15 and the structure 9 and avoids the transfer of bending moments from the structure 9 to the ring 15. It follows that, due to this elastic deformation, the ring 15 tends to be insulated from the structure 9 with regard to deflections, such that the deformations of the structure 9 under load do not bend sectors 16.

In other words, this configuration of the arms 31, under the effect of the torque-induced shearing actions, enables sectors 17 and therefore the ring 15 to rotate rigidly about axis 3. If the arms 31 of each pair were parallel to each other and/or were replaced by a single arm, as in the known art, the result would be a configuration incapable of 'insulating' the ring 15 from flexure of the structure 9, because the latter would be transmitted unchanged to the ring 15, without any consequent benefit.

As can be seen from the accompanying figures, the arms 31 converge towards the ring 15 and not towards the structure 9: if the arms 31 converged towards the structure 9, simulations carried out indicate that deformations would be transferred from the structure 9 to sectors 17, and even with actual amplification of these deformations.

Considering the above-indicated 'insulation' of the ring 15 from flexure of the structure 9, sectors 16 must only support the tangential shearing actions. It follows that, from the design viewpoint, it is possible to size the ring 15 by taking into consideration only these tangential shearing actions, and therefore it is possible to significantly reduce the thickness of sectors 16 with respect to known solutions equipped with an integral planet-carrier.

In particular, as mentioned above, the thickness s in the axial direction of portions 18 is said to be 'thin', i.e. the transverse section where the moment of inertia I is minimum (where $I=h*s^3/12$) has a thickness s and a width h that respect the following geometric ratio: $h>5\ s$.

As flexural rigidity is the determining element in quantifying overloads on the planet gears 2 in the presence of manufacturing and assembly errors, it follows that a ring 15 equipped with extremely thin sectors 16 intrinsically guarantees low sensitivity and therefore high tolerance to constructional errors, without necessarily having to adopt flex-pin-type solutions for the pins 19.

In fact, machining tolerances and assembly errors cause a deviation from optimal operating conditions, in particular a tangential displacement of the planet gears 2, i.e. a rotation about an axis of flexure orthogonal to the axis 4. This displacement would tend to cause an imbalance among the torque paths between the arrays 2a and 2b. Instead, in the case in hand, sectors 16 deform automatically due to their low flexural rigidity and therefore absorb these errors and restore an acceptable operating condition.

In addition, because of errors and tolerances, in use, a moment M occurs at the point, of joining between the pins 19 and sectors 16, and thus a variation in the nominal load transmitted by the pins 19. To limit overload with respect to the nominal load, moment M must obviously be as small as possible. The greater the flexibility of the ring 15 (i.e. low flexural rigidity), the smaller will be moment M.

In the case in hand, by setting an extremely low flexural rigidity K (i.e. by reducing the thickness s of sectors 16) the operation and reliability of the gearing 1 are not compromised, yet a high tolerance to constructional errors is ensured: in particular, it is possible to maintain the load sharing factor between the planet gears 2 at a value in the order of 5% (the applications for wind turbines without any extra measures have instead a load sharing factor above 20%). Therefore, the claimed solution achieves a result of radically higher performance with respect to known solutions.

Furthermore, the gearing is of low weight, due to the fact that the toothings of the planet gears 2 do not need to handle overloads and can therefore be sized for maximum stresses lower than those of known solutions, and due to the reduced thickness s of the ring 15 at sectors 16.

Returning to FIGS. 2 and 4, as mentioned above, portions 35 and 36 are preferably stiffened against flexure and torsion with respect to the tangential axes. In particular, the coupling points of the arms 31 to portions 35 and 36 at ends 33 and 34 under load tend to define respective virtual hinges or elastic hinges, with hinging axes substantially radial with respect to axis 3. In other words, the quadrilaterals that connect the ring 15 to the structure 9 are virtual articulated quadrilaterals, in which the articulated joints of a real quadrilateral are replaced by zones of localized deformation.

The shape and dimensions of each deformable quadrilateral (for example: length, radial thickness, width, relative distance and inclination angles of the arms 31) are determined on a project basis, for example through opportune simulations, to ensure the equal distribution of the loads on the various torque transfer paths.

In particular, each quadrilateral is configured by design to render deformation of the ring 15 independent of the deformations of the structure 9, as described above, and to optimize the distribution of rigidity in the planet-carrier 5, as well as ensuring the feasibility of the planet-carrier 5 from the technological viewpoint.

In the preferred shown embodiment, each sector 17 comprises a wall 40 coplanar with sectors 16 and having substantially the same thickness s as sectors 16. At the same time, portion 36 consists of two ribs 41 and 42, which are arranged along the outer annular edge of the ring 15 and protrude in opposite directions from the wall 40. In particular, rib 42 is opposite to structure 9 with respect to plane P.

Each sector 17 also comprises a rib 43, which is arranged along the inner annular edge of the ring 15 and protrudes from the wall 40 in the same direction as rib 42, and two lateral ribs 44, which protrude from the wall 40 in the same direction as ribs 42 and 43 and connect the ends of rib 42 to those of rib 43.

Therefore, for each sector 17, ribs 42, 43 and 44 delimit a cavity, the bottom of which is defined by the wall 40. The flexural rigidity of portion 36 enables keeping the relative position of the two ends 34 substantially unchanged during utilization of the gearing 1. At the same time, ribs 44 and 43 define a stiffening member to avoid torsion of portion 36 about the tangential axis of portion 36.

Referring to FIGS. 1, 2 and 5, portions 35 of the structure 9 comprise: a wall 45, orthogonal to axis 3 and axially facing sectors 17, and a plurality of ribs 46 arranged on the wall 45 on the opposite side to the ring 15 and configured to torsionally stiffen portion 35 without compromising the weight of the planet-carrier 5. Portions 35 and sectors 23 are united at the flange 10 by a bell-shaped portion 47, which is arranged around an axial end of the ring gear 6 that, in turn, surrounds array 2a and the arms 31.

From what has been described in the foregoing, the advantages given by the arms 31 to the planet-carrier 5 and therefore to the operation of the gearing 1 are evident. In particular, as described in detail above, the flexibility of the arms 31 prevents the transfer of localized bending moments from the structure 9 to the ring 15, and therefore the latter can be designed ignoring these bending moments and therefore have a reduced thickness s for sectors 16 with respect to solutions of the known art where a planet-carrier made in one piece is employed. In turn, the reduction in the thickness s provides the ring 15 with high flexibility, which automatically compensates for any relative displacements in the tangential direction between two coaxial planet gears belonging to the different arrays 2a and 2b caused by constructional or assembly errors and by machining tolerances. Having a very low flexural rigidity also means reducing the overloads in the zones where the pins 19 are connected to the sectors 16.

Furthermore, the solution described and illustrated in the accompanying figures enables optimizing the distribution of rigidity in the planet-carrier 5 with respect to plane P, in order to reduce load maldistribution to a minimum.

At the same time, the two arms 31 avoid the use of jointed devices between the structure 9 and the ring 5, and therefore wear and the number of components are reduced and reliability increased with respect to known solutions fitted with such devices.

In any case, the adopted solution does not prevent the use of flexpin-type solutions regarding the pins 19 to further improve compensation for constructional or assembly errors and machining tolerances.

Furthermore, making the planet-carrier 5 in a single piece not only reduces the number of parts to be manufactured and assembled, but also allows reducing the risks of breakage due to fretting fatigue on contact-coupled components subjected to cyclic loads.

Despite the planet-carrier 5 being made in a single piece, the assembly of the gearing 1 is relatively simple, especially due to the recesses 23 and the use of gears with straight teeth, which allow axial assembly/removal of the planet gears 2 of array 2a.

Furthermore, the two sun gears 7 are made in a single piece with the shaft 8, so as to reduce the radial bulk of the gearing 1. This configuration of the sun gears 7 effectively entails an unbalancing of the torsional rigidities of the two torque transfer paths, but the characteristics of the above-described planet-carrier 5 allow for the compensation of this unbalancing. At the same time, with the compact radial dimensions of the sun gears a higher transmission ratio is achieved for a given bulk, or smaller bulk for a given transmission ratio.

Based on what has been described above, other secondary advantages are will also be evident to a person skilled in the art.

From the foregoing, it is evident that modifications or variants can be applied to the planet-carrier 5 without departing from the scope of the invention as defined in the appended claims.

In particular, the dimensions, relative distance and inclination angles of the arms 31, just as the dimensions and geometry of portions 35 and 36, could be different from that indicated by way of example.

Furthermore, each sector 17 could be fastened to the structure 9 by more than two elastically deformable arms.

Furthermore, the configuration of the gearing 1 could be one with a static planet-carrier and rotating ring gear (so-called star configuration), with a rotating planet-carrier and a static ring gear (so-called planetary configuration), or with all of the elements rotating (so-called differential configuration).

Furthermore, as mentioned above, alternative options not shown could have portion 10 and/or portion 47 in positions and/or with shapes different from those shown. In particular, it is possible to have these components arranged at one lateral end of the gearing 1 along axis 3, at a greater or smaller radius with respect to the ring gear 6 and to the structure 9.

The invention claimed is:

1. A planet-carrier for an epicyclic gearing, the planet-carrier comprising:
   an annular structure comprising a coupling portion to connect said planet-carrier to a rotating member or to a static structure in an angularly fixed manner;
   a ring coaxial to said annular structure along a transmission axis and consisting of a plurality of plate-shaped sectors and of a plurality of attachment sectors, alternating with one another about said transmission axis; said plate-shaped sectors lying on a plane orthogonal to said transmission axis;
   a plurality of pins, which are fixed with respect to said plate-shaped sectors, protrude in opposite directions from said plate-shaped sectors along respective axes, parallel and eccentric with respect to said transmission axis, and are adapted to carry respective planet gears;

connection means that secure said structure to said attachment sectors;

wherein said connection means comprise, for each of said attachment sectors, a corresponding pair of arms, which converge with each other towards said ring and are elastically deformable so as to allow a relative movement between said ring and said structure under a load.

2. A planet-carrier according to claim 1, wherein said arms have ends defining a fillet with base portions, which are substantially tangential or circumferential with respect to said transmission axis and are stiffer than said arms.

3. A planet-carrier according to claim 2, wherein, for each of said attachment sectors, said connection means are defined by a trapezoidal-shaped quadrilateral consisting of said pair of arms and of said base portions.

4. A planet-carrier according to claim 3, wherein each of said trapezoidal-shaped quadrilaterals is sized so as to define, under load, four virtual hinges at the ends of said arms, with hinging axes that are substantially radial with respect to said transmission axis.

5. A planet-carrier according to claim 2, wherein each of said attachment sectors comprises:
- a wall which is coplanar with said plate-shaped sectors;
- an outer rib defining one of said base portions, arranged along the outer annular edge of said ring and protruding in the axial direction from said wall.

6. A planet-carrier according to claim 5, wherein each said attachment sector comprises two outer ribs protruding in opposite axial directions from said wall.

7. A planet-carrier according to claim 5, wherein each said attachment sector further comprises:
- an inner rib arranged along the inner annular edge of said ring and protruding in the axial direction from said wall; and
- two lateral ribs, which protrude from said wall in the same direction as said inner rib and connect the ends of said outer rib to those of said inner rib.

8. A planet-carrier according to claim 1, wherein said ring, said structure and said connection means form part of a single-piece body.

9. A planet-carrier according to claim 8, wherein said pins also form part of said single-piece body.

10. A planet-carrier according to claim 1, wherein said structure comprises a plurality of hollow sectors, alternating with said connection means about said transmission axis and defining respective recesses, which are axially aligned with said pins and have shape and dimensions such as to allow respective planet gears to axially pass through said structure.

11. A planet-carrier according to claim 10, wherein said structure comprises, for each of said hollow sectors, a corresponding stiffening rib, which protrudes radially outwards from said hollow sector.

12. An epicyclic gearing comprising:
- a planet-carrier according to claim 1;
- a plurality of planet gears mounted so as to rotate on said pins and defining two symmetric arrays with respect to said plane;
- a ring gear having at least one inner toothing that meshes with said planet gears;
- at least one sun gear that is rotatable about said transmission axis and meshes with said planet gears.

13. An epicyclic gearing according to claim 12, wherein it comprises a shaft coaxial to said sun gear along said transmission axis; said sun gear and said shaft forming part of a single-piece body.

* * * * *